United States Patent [19]

Dillner et al.

[11] 4,301,584

[45] Nov. 24, 1981

[54] METHOD OF FORMING FIBER AND METAL MATRIX COMPOSITE

[75] Inventors: James R. Dillner, Amston, Conn.; Hilton F. Stone, Jr., West Palm Beach, Fla.

[73] Assignee: United Technologies Corporation, Hartford, Conn.

[21] Appl. No.: 117,169

[22] Filed: Jan. 31, 1980

[51] Int. Cl.³ .................... B23P 15/04; B23K 31/00; B21D 53/78
[52] U.S. Cl. .................... 29/156.8 B; 29/421 R; 29/423; 72/63; 72/293; 72/363; 228/190
[58] Field of Search .......... 29/156.8 B, 421 R, 419 R, 29/455 LM, 423; 72/61, 63, 363, 293; 416/229 R, 229 A, 230; 228/190

[56] References Cited

U.S. PATENT DOCUMENTS

| | | | |
|---|---|---|---|
| 1,329,969 | 2/1920 | Harrison | 72/63 |
| 2,270,185 | 1/1942 | Dulmage | 72/293 |
| 2,728,317 | 12/1955 | Clevenger et al. | 29/421 |
| 2,978,806 | 4/1961 | Herbert, Jr. | 29/455 LM |
| 3,024,525 | 3/1962 | Wisberger | 29/421 |
| 3,060,561 | 10/1962 | Watter | 29/455 LM |
| 3,072,225 | 1/1963 | Cremer et al. | 29/455 LM |
| 3,132,420 | 5/1964 | Pompa | 72/363 |
| 3,170,428 | 2/1965 | Herman et al. | 29/455 LM |
| 3,196,533 | 7/1965 | Ida et al. | 29/455 LM |
| 3,600,103 | 8/1971 | Gray et al. | 416/226 |
| 3,649,425 | 3/1972 | Alexander | 416/229 A |
| 3,701,190 | 10/1972 | Stone, Jr. | 29/156.8 |
| 3,807,009 | 4/1974 | Östbo | 29/421 R |
| 3,864,797 | 2/1975 | Banks | 72/63 |
| 3,895,436 | 7/1975 | Summers et al. | 29/421 R |
| 3,920,175 | 11/1975 | Hamilton et al. | 228/173 |
| 3,927,817 | 12/1975 | Hamilton et al. | 228/157 |
| 3,934,441 | 1/1976 | Hamilton et al. | 72/60 |
| 4,045,986 | 9/1977 | Laycock et al. | 29/421 R |
| 4,077,109 | 3/1978 | Larson | 29/421 R |
| 4,087,037 | 5/1978 | Schier et al. | 72/63 |
| 4,101,065 | 7/1978 | Novikov et al. | 228/190 |

Primary Examiner—Daniel C. Crane
Attorney, Agent, or Firm—C. G. Nessler

[57] ABSTRACT

Disclosed is an improved method of fabricating boron fiber and aluminum matrix composite structures, especially gas turbine compressor blades having titanium metal skins. Titanium skins and boron aluminum composite cores are preformed by gas pressure and hard dies prior to hot pressing. The composite sheets of the core are preformed with the use of expendable carrier sheets, which hold the stacked sheets firmly as both the carrier sheets and composites are shaped through moderate temperature and gas pressure against a hard die. The preforming permanently shapes and lightly bonds the composite sheets. The skins are preformed in an analogous process using gas pressurization of a metal envelope into die cavities. The skins and composite core are then hot pressed in hard dies to form the finished part.

8 Claims, 10 Drawing Figures

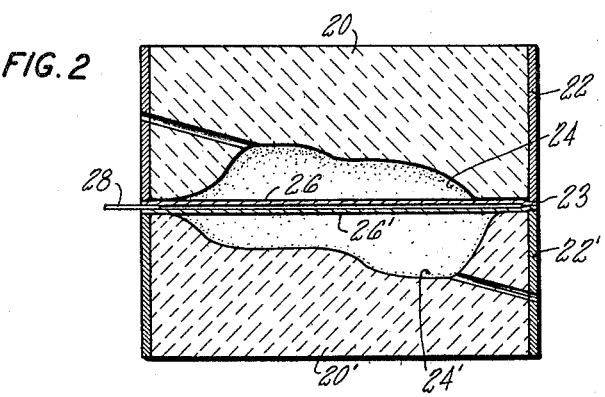
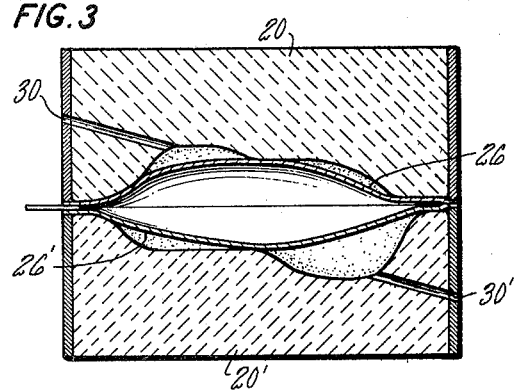
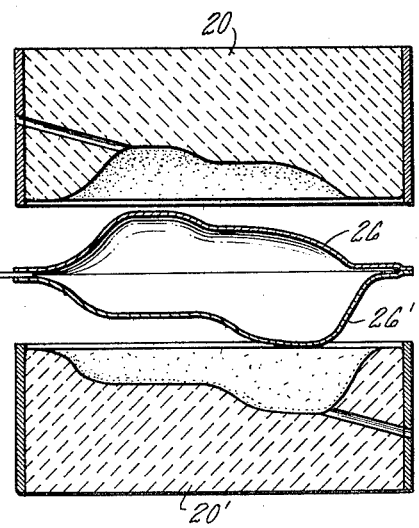

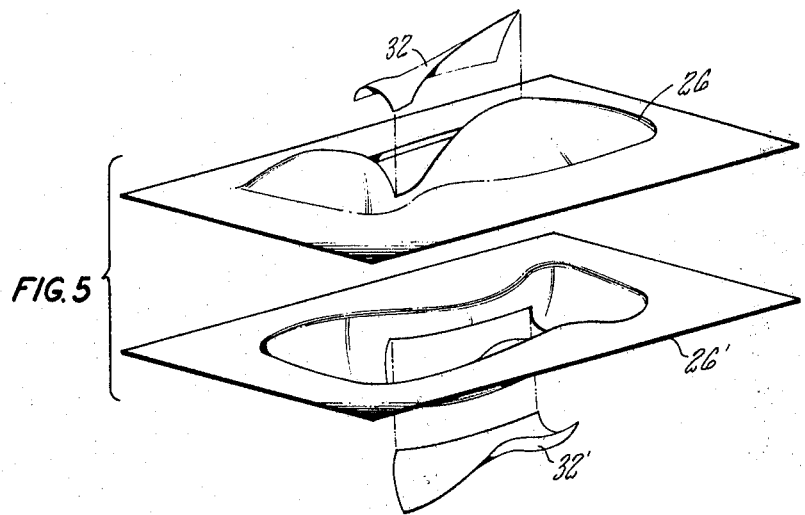
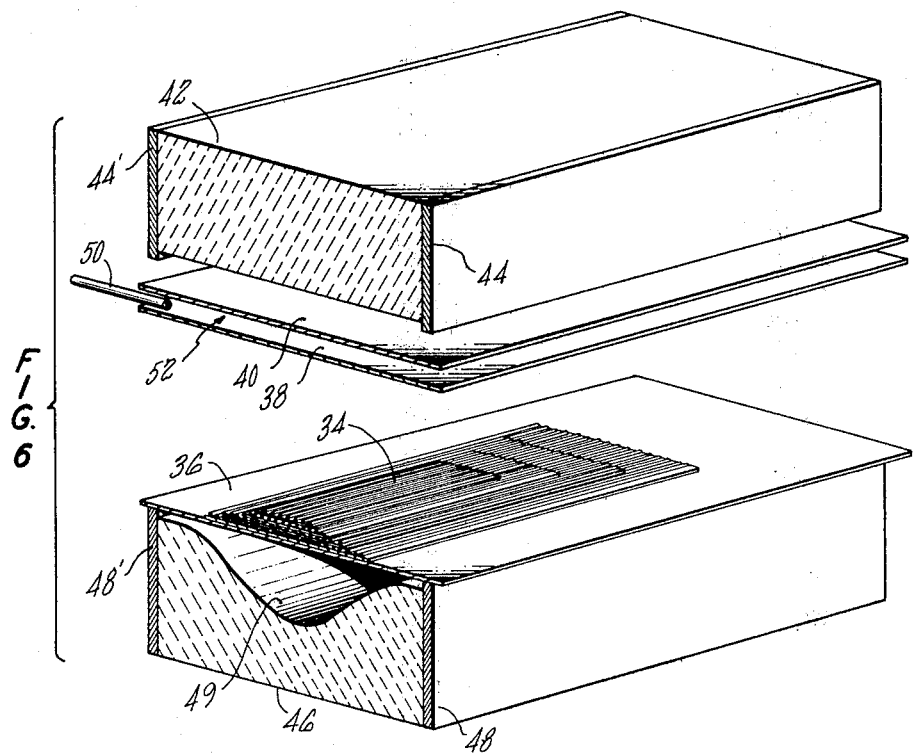

METHOD OF FORMING FIBER AND METAL MATRIX COMPOSITE

The U.S. Government has rights in the invention herein, pursuant to contract F 33615-76-C-5318, awarded by the Air Force.

BACKGROUND ART

The present invention relates to the fabrication of structural shapes of composite materials, particularly to the fabrication of aircraft engine blades made of boron fiber and aluminum.

Composite materials, such as the combination of boron fibers in an aluminum metal matrix, are of interest to aircraft designers because of their high specific strength and specific stiffness. However, because of these properties and the brittleness often associated with the fiber material, they are very difficult to fabricate. The composite material is generally provided as a raw material in the form of a flat sheet, having one layer of fibers. The typical component is comprised of a multiplicity of layers or sheets which have been compacted together to form a unitary object bound by the matrix material. The consolidation is generally accomplished by placing a multiplicity of precut sheets of varying configuration and orientation within a rigid die and applying sufficient force and temperature to densify the article.

The foregoing procedure works well when the object has a regular cross section, but there is considerably more difficulty when the object has a varying cross section and contour, such as is characteristic of a compressor blade of a gas turbine engine as described further herein. When the flat sheets of composite material are assembled and placed in the contoured die they (a) do not fit properly, and (b) tend to shift out of position as the dies are closed and the contouring forces are applied. Since the typical fiber does not, by virtue of its choice, have appreciable ductility or deformability compared to the matrix material, the mis-positioning of fibrous material will result in a defective part, with there being excess material in one location and insufficient material and densification in another. Various techniques such as tack welding and fixturing have been employed to try to overcome these problems, but on the whole they have not been satisfactory. A further difficulty in the working of many composite materials which are consolidated by hot pressing is that the pressing temperature and time must be limited in order to avoid deleterious interaction between the fibers and the matrix material.

Additionally, on most composite material structures which are subjected to severe environments a protective cladding or skin is applied. Such is the case with gas turbine compressor airfoils, wherein a sheet of metal such as titanium is generally clad to the surface of boron aluminum composite airfoils. This sheet is best applied during the consolidation process of the core segment and this adds a further variable which must be coped with.

The present invention will be seen to relate to the use of gas pressure for preforming composite material cores and skins prior to their being bonded as a finished assembly. Gas pressure has been previously used to form sheet metal objects, as is disclosed in various U.S. patents. Wisberger U.S. Pat. No. 3,024,525 and Somers et al. U.S. Pat. No. 3,895,436 describe the internal pressurization of double wall objects to expand the space between the walls and thus free-form useful hollow structures. Larson U.S. Pat. No. 4,077,109 describes a similar procedure, but with the expansion taking place within a die, thereby producing an object with a definite contour determined by the die. Hamilton et al. in U.S. Pat. Nos. 3,934,441, 3,920,175, and 3,927,817 describe the combined shaping and bonding of hollow metal objects by the use of gas pressurization in a hard die. Schier et al. in U.S. Pat. No. 4,087,037 show the use of a flexible die or pressure membrane to form a contoured structure against a hard die. In U.S. Pat. No. 3,701,190 Stone, Jr., an inventor herein, discloses a method of compacting a composite airfoil using a pressurized membrane. Except for the last mentioned patent, the prior art does not relate to the forming of composite containing structures nor is it suggestive of ways of overcoming the problems described above. The last mentioned patent disclosure comprises a method wherein the airfoil is compacted and shaped by the conventional rigid die, but with the addition of a membrane laid against one of the die halves. Gas pressure applied to this membrane aids in the final compaction of the structure. But prior to the instant invention there was no appreciation of any means by which either the skin or composite core material could be advantageously and effectively preformed prior to its being placed in the final compaction die.

DISCLOSURE OF INVENTION

An object of the invention is to improve the method of fabricating composite containing structures, most particularly by providing means to shape the components of the structure prior to their final consolidation into a unitary object.

According to the invention the composite sheets, and optionally the skin or cladding material, are subjected to preforming operations prior to their introduction into the final consolidation step in hard dies. Composite sheets are contoured by placing a multiplicity of sheets between two expendable carrier sheets to form a sandwich package. The carrier sheets, which have a greater area and dimension than the composite sheets, are then restrained around their periphery and fluid pressure is applied to one side of the package in sufficient force to cause permanent deformation of the package. This results in deformation of the composite material which is held firmly between the two carrier sheets by the forces created in resistance to the fluid forces. In preferred practice of the invention, the package is forced by gas pressure against a contoured hard die until the package substantially assumes the shape determined by the surface of the die. By this method the composite sheets can be readily deformed to a complex contour. Preferably, the composite sheets are not bonded during the preforming operation just described. But due to the compressive force on the composite sheets brought about by their entrapment between the two carrier sheets, they do not move laterally with respect to one another as is the case when they would be formed in hard dies. Some light bonding may be accomplished, but preferably the temperature time and force are insufficient to cause consolidation, thereby desirably avoiding any start of deleterious interaction between the matrix and fiber material until the final compaction step which is in a conventional hard die.

According to the invention, when a structure having a composite core and metal skins is desired, the core is formed as described above. The skins are formed as follows: Two mating flat sheets are placed between another hard die set having opposing cavities. The space between the sheets is pressurized until they expand to the internal contours of the die. Upon removal from the die, only a portion is cut from the resultant expanded hollow structure to produce a preformed skin part with the desired shape and contour. When the structure is an object such as a gas turbine compressor airfoil, the opposing skins of the airfoil structure have different contours. They are produced in opposing sides of the expanded hollow structure by providing different contours in the opposing die cavities. Thereafter, the two preformed skins are placed on opposing sides of the preformed composite core part and the three parts are then consolidated and bonded in a hard die.

The method of the invention provides an economic and reliable way of making irregular cross section and contour structures of composite materials. The use of low cost dies, such as ceramic cast dies, is permitted. The major advantage of the process comes from the addition of the preforming technique using the carrier sheets. Composite sheets will thereby have the correct disposition during the final pressing operation, there will be an absence of fiber breakage, and parts will be produced in greater uniformity and reliability.

BRIEF DESCRIPTION OF DRAWINGS

FIGS. 2, 3 and 4 show the sequence of operations by which the metal skins are formed by fluid pressure in hard dies.

FIG. 5 shows how a skin part is selectively cut from the formed sheets made in the operations shown in FIGS. 2-4.

FIG. 6 is a cross section view of the assembly of die halves, carrier sheets, and composite sheets used to preform the composite sheets.

BEST MODE FOR CARRYING OUT THE INVENTION

The preferred practice of the invention herein is described within the context of the fabrication of a compressor blade airfoil usable in a gas turbine engine, made of boron fibers of about 0.25 millimeters (0.010 inch) diameter embedded in an aluminum alloy matrix. These airfoils which are described in the U.S. Pat. No. 3,701,190 to Gray et al. and are typically characterized by an airfoil cross section of changing dimensions and rotation in space along the axis of the blade. Thus, the typical compressor blade has a highly contoured surface. Boron fiber and aluminum alloy (hereafter "boron aluminum") materials have high specific strength and stiffness, owing to the unique characteristics of the boron fiber. While the aluminum alloy matrix is ductile, the fibers have very little ductility and if excess local deformation is caused, the fibers will fracture. Boron aluminum materials are able to be contoured both through elastic deformation of the fibers (which is substantial owing to the small cross section of the fibers) and realignment of the fibers within the soft matrix. In general boron aluminum composites can readily be used without a metal skin. However, since compressor airfoils can be subject to particulate damage they are commonly protected by the adhesion of a sheet of metal such as titanium alloy to the exposed surface.

The fabrication of a compressor blade comprised of a contoured core of boron aluminum composite with a titanium alloy skin is difficult and serves well to illustrate the invention. However, it will be understood that the invention herein will be usable for other composite material combinations and other structures as well.

The common and previously known mode of converting boron aluminum sheet material into a consolidated airfoil is as follows: a single layer of boron fibers is adhered to a very thin (about 0.025 mm) backing sheet of aluminum metal, usually plasma sprayed aluminum. A typical airfoil may require the thickness of up to 62 sheets, but as a reference to the cross section in FIG. 7 will show, the thickness of an airfoil varies. Thus, the sheets are cut in changing widths so that there are more layers in the center portion than at the outer portions. Further, the angular orientation with respect to the longitudinal axis of the blade is varied from layer to layer to provide optimum structural characteristics in the finished component. Heretofore, the multiplicity of stacked sheets has been placed between flat metal skin sheets in a hot contoured die and the entire assembly has been hot pressed. During the closing of the dies the sheets are warped and deformed to the die contour, but as mentioned this results in mislocation of the sheets and resultant defective parts.

Figure 1:
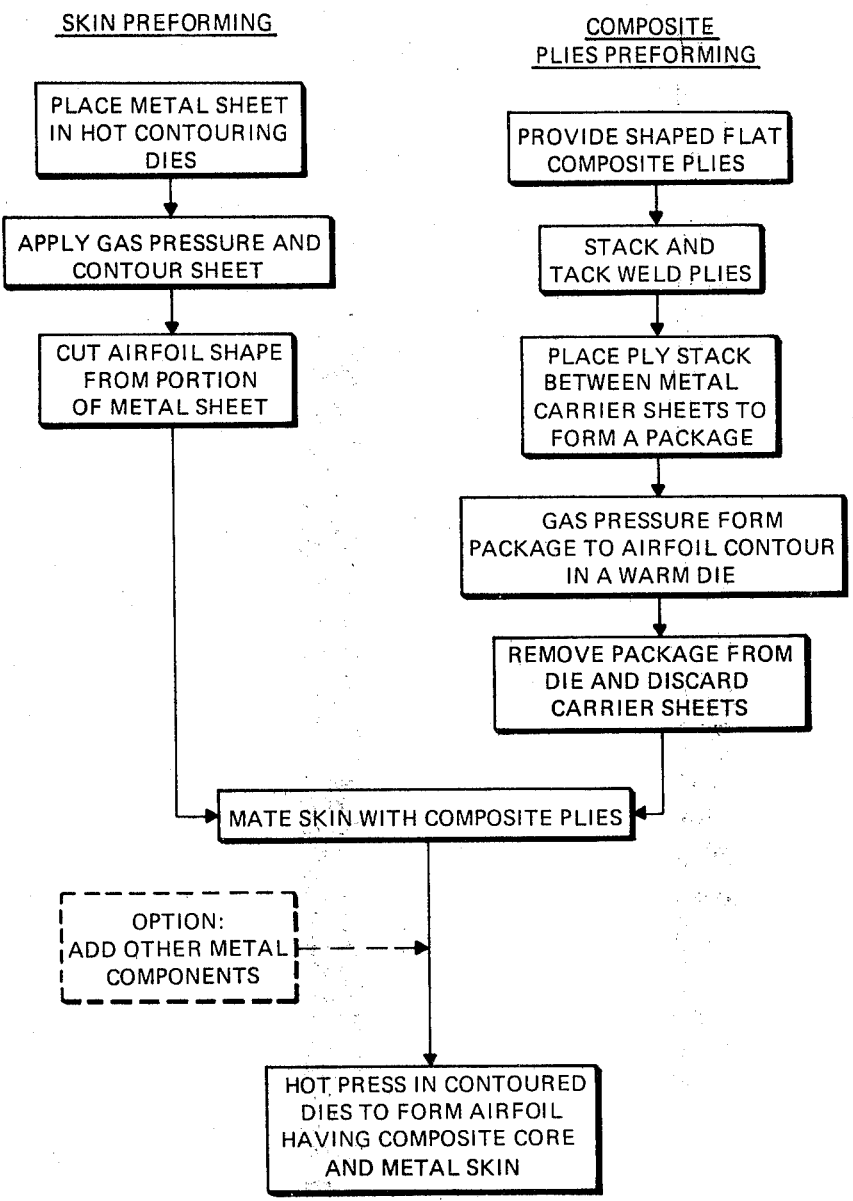
FIG. 1 is a flow chart which shows the sequence of operations in the inventive method.

As will be now described, the present invention involves improvements wherein the metal skin and the composite plies comprising the core are preformed prior to the final hot pressing operation just described. The improved process is comprised of three elements as shown in FIG. 1: preforming of the skin, preforming of the composite plies, and hot pressing of the mated preformed skin and plies. As was mentioned the use of a skin is optional, and when desired a useful part can be made by practicing only the second two steps.

Skin Preforming

The skin preforming will be first described. The skin metal of the preferred embodiment is a strong lightweight metal, such as Titanium-6 Aluminum-4 Vanadium of about 0.25 millimeters (0.010 inch) thickness. FIGS. 2-5 show the skin forming technique and basic apparatus. Two sheets of skin material 26 and 26' which are larger than the desired skin part are placed between two ceramic die halves 20 and 20'. The sheets are thereby laterally disposed between vertically opposing contoured cavities of the die when the die is closed. The sheets are clamped around their periphery 23 by means such as rails 22 and 22' attached to the die, with sufficient force to form a gas-tight seal. Alternative means may be used separately or in combination to achieve the seal; welding is preferred. As will be understood it is very desirable but not absolutely necessary that the sheets be held fixedly in space around their periphery to prevent lateral movement of the edges. Means, such as the tube 28, are provided for introducing fluid into the space between the two sealed sheets. Typically, the dies 20 and 20' are economically made of a ceramic castable material and contain within themselves heaters sufficient to raise the temperature of the die and sheets disposed therein to a temperature where forming of the metal is easily carried out. It is desirable that means, such as ports 30 and 30' be provided for venting or evacuating the die. Fluid pressure is introduced through port 28 and thereby causes expansion and permanent deformation of the sheets, one sheet moving toward one-half of the die cavity and the other sheet moving toward the opposing die cavity, as shown in FIG. 3. With the application of sufficient temperature, pressure, and time the sheets are caused to conform fully to the cavities of the die, whereafter the pressure may be released, the die halves parted, and the contoured structure removed as shown in FIG. 4.

For titanium sheet metal skins, it is desirable to use processing parameters at which the sheet metal is in the superplastic range. Useful parameters we have found are 870° C. (1600° F.) and 0.55–0.70 MPa (80–100 psi) argon gas pressure for 3 minutes. Of course, other temperatures and fluids may be used so long as they are compatible with preserving the properties of the skin being formed. It is found that using the procedure described above, the sheet metal will be evenly stretched without splitting or wrinkling and relatively minor thinning in non-critical areas. This is so even though as shown in FIG. 5 the formed sheet has compound curves which would result in wrinkling in any normal forming co-operation. For metallurgical and practical reasons we use the low forming temperature described above for titanium. In doing so we find that it is necessary that the sheets not only be sealed but that they be fixedly clamped at their peripheries in order to avoid wrinkling. For other materials' parameters and contouring we believe it may not be necessary to fixedly hold the sheets.

For a compressor blade the opposing skins have differing contours, the opposing die cavities are shaped to produce a skin for each side. But only a portion of the die cavities, and thus the metal formed therein, is useful for obtaining the skin part. There may be excess thinning or tearing if there are extreme shape changes near the periphery of the die, as happens if the cavity only were definitive of the desired skin part, without transition sections. Thus, as shown in FIG. 5, only a portion 32, 32' of each sheet 26, 26' is used. This portion is cut using thermal or mechanical means from the sheet and comprises the preformed skin; the remainder of the sheet is discarded.

Core Preforming

The basic method of preforming the composite core part will now be described. As shown in cross section in FIG. 6, a somewhat similar ceramic die with metal rails is preferably used. Referring to FIG. 6, the die has an upper portion 42 with full peripheral rails 44, 44' and a lower portion 46 with rails 48, 48' which mate the rails of the upper portion. It will be seen that the lower portion of the die 46 has a cavity 49 while the upper portion of the die does not have any particular configuration. The reasons for this will become apparent. A multiplicity of precut boron aluminum sheets 34 are placed between a first carrier sheet 36 and a second carrier sheet 38 to form a package which is placed between the die halves. The carrier sheets have areas and peripheries substantially greater than the largest of the pieces of composite sheet material. An optional sealing membrane 40 may be provided above the uppermost carrier sheet 38. The die halves are closed to (a) provide a fluid-tight seal between the upper carrier sheet 38 and the membrane 40 and (b) fixedly restrain both the upper carrier sheet 38 and lower carrier sheet 36 around its entire periphery. It is not necessary in the practice of the invention to have a fluid-tight seal between the carrier sheets. The space 52 between the upper carrier sheet and the membrane is best pressurized by means of tube 50 which is connected to a gas supply. If the upper die half 42 has the proper characteristics, the membrane 40 may be dispensed with as its only object is to efficiently cause pressurization of the surface of the upper carrier sheet 38.

Figure 7:
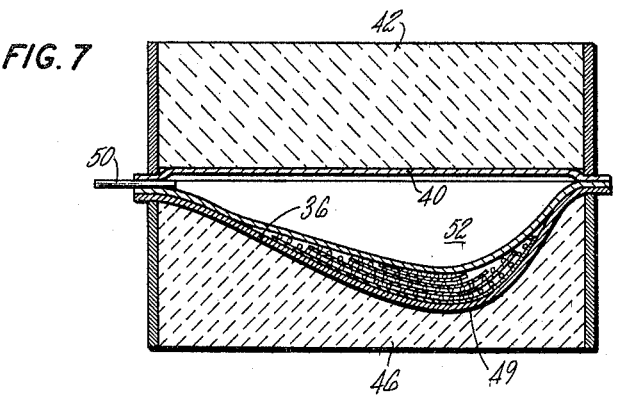
FIG. 7 shows the composite sheets in the die after fluid pressure forming.

The stack of composite material sheets is thus captured between the two carrier sheets to form a package. When gas pressure is applied to the space 52 above the upper carrier sheet the entire package is forced toward the die cavity 49, as shown in FIG. 7. The gas pressure is applied at sufficient intensity, time and temperature to deform permanently the package against the die cavity. As the package moves toward the die cavity 49, the composite sheets are firmly captured between the carrier sheets and thus are prevented from relative lateral movement. The lower carrier sheet 36 is ultimately forced to assume the contour of the die cavity 49, and with sufficient pressure the entire package will be compressed against the hard die cavity, and assume a shape thereby determined. Owing to the fact that they are restrained at their peripheries, the carrier sheets will undergo substantial elongation. It is the resistive force to such deformation which we believe enables the invention to be effective. Thus, in the method just described, the composite plies will be deformed by the combined action of their capture between the carrier sheets, the fluid pressure, and the hard dies. The new method avoids any very localized contact on the composite. Thus it avoids significantly the forces which cause lateral shifting, mis-positioning and misforming of plies. After the package is forced to assume the contour of the die cavity, the pressure is released, the die is parted, the package is removed from the die and the carrier sheets are separated and discarded. It is found with the choice of proper parameters that the lower carrier sheet side of the composite plies will have substantially the contour of the die cavity (but for the effect of the carrier sheet and any minor "spring back"). The die contour is of course chosen to produce the contour desired in the composite portion of the blade. Since the carrier is thin, the die shape is substantially the same as that sought in the mating skin. Obvious compensation may be made in the case of a thicker carrier or skin. The configuration of the upper surface of the composite sheets will be determined by the lower surface configuration, the multiplicity of variously shaped sheets, and the degree of compaction, all of which may be controlled.

We have characterized the step just described as "preforming". As such, the parameters are chosen so that the boron aluminum material will be amenable to deformation, but they are not those which will cause substantial consolidation of the plies. The higher temperatures which result in consolidation are desirably avoided as they cause degradation of the fibers and are necessarily encountered in the subsequent step which attaches the skins. But in cases where there are to be no skins, it would be possible to use carrier sheets and parameters such that consolidation is achieved.

Also, the parameters we prefer are those which result in relatively limited bonding between the separate composite sheets. It is difficult to quantitatively state the extent of bonding, but the absence of substantial consolidation is indicative to those skilled in the art of a corallary lack of significant bonding. As stated, there is elastic deformation of the fibers; and the fiber elasticity force toward resumption of the original shape is in part resisted by the permanently deformed matrix and bonding between the sheets. When the number of sheets is small, around 4-5, there will be more "spring back" toward the original shape, than when the sheets number around 30, where there is minimal spring back. Thus, the bonding between the sheets evidently aids the retention of shape of the composite sheet assembly, and in the best practice of the invention with 0.25 mm boron aluminum, the number of sheets should be more than 8, and the parameters should be chosen to produce some light bonding.

For the preforming just described, 31 plies were formed using a temperature of about 850°-900° C. with carrier sheets of 1.5 mm AISI 6061-0 aluminum alloy. The package was inserted in preheated dies and argon gas pressure was raised slowly to a peak pressure of about 3 MPa (400 psi) over a period of about 14 minutes, held for about 1 minute, and then released. Then the part was removed from the die and allowed to cool for about 45 minutes to room temperature before the carrier sheets were removed. (If it were desired to achieve consolidation as mentioned above then the carrier sheets could be of a higher temperature material, and a stop off or anti-bonding agent would be used to prevent bonding of the carrier sheets to the composite sheets.) While we prefer inert gas, other fluids including liquids may be used. It also will be evident that pressure can be inversely varied with temperature in carrying out the pressure forming, within limits dependent on the materials involved.

Figure 10:
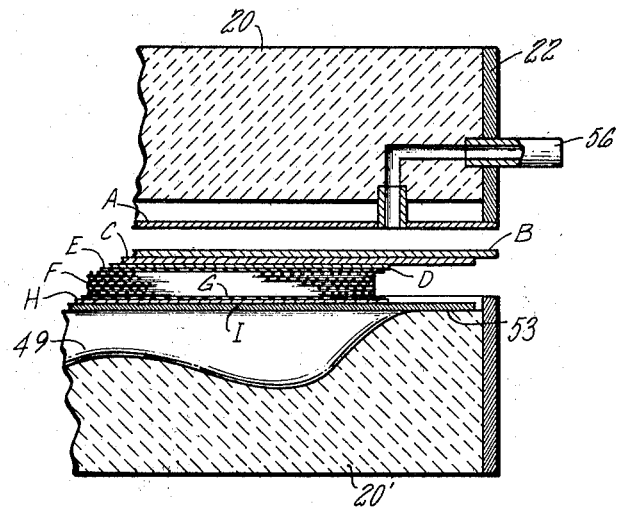
FIG. 10 shows a partial sectional view of an alternative section similar to FIG. 6.

We have added further refinements to our basic invention described above during the course of fabricating a number of compressor blades. These comprise adding additional elements to the package which is interposed between the die halves. In its refined state the package, shown in FIG. 10, comprises in sequence from one side to the other:

A. 1.3 mm (0.050 in): Steel sealing membrane
B. 1.5 mm (0.060 in): Aluminum upper carrier sheet with a periphery holdable by the rails
C. 1.5 mm (0.060 in): Aluminum sub-carrier sheet with a periphery just smaller than is holdable by the rails
D. 0.5 mm (0.020 in): Aluminum cushion sheet having about the dimension of the largest composite sheet
E. 0.08 mm (0.003 in): Aluminum protector sheet
F. 31 plies of boron aluminum composite sheet
G. 0.08 mm (0.003 in): Aluminum protector sheet
H. 0.5 mm (0.020 in): Aluminum cushion sheet having about the dimension of the largest composite sheet
I. 1.5 mm (0.060 in): Aluminum carrier sheet of same dimension as Item C.

The refined embodiment is operative in essentially the same manner as the basic embodiment described above. The ceramic die is shaped so that the carrier sheets C and I would be restrained by action of a ledge 52 in the die 20'. The frictional force caused by pressure on these sheets against the die ledge is sufficient to restrain them. The function of the sub-carrier C is to prevent penetration of the gas pressure containing carrier B by any sharp fiber ends of the composite sheet. The purpose of the protector sheet E is to avoid contamination of the composite by a graphite coating (Dylon AE, Dylon Industries, Cleveland, Ohio) applied between all the aluminum sheets to facilitate slippage during forming. The elements G and H, have functions similar to their opposing side elements.

Another refinement we have employed is to locally reinforce portions of the lower carrier sheet to locally decrease its deformability. We do this when excess spreading of the composite fibers is observed and attributed to premature and excess local deformation of the lower carrier sheet. Our method has been to wrap 0.25×0.5 mm AISI 304 stainless steel bands around the package before insertion in the die so that they pass across the lower carrier sheet in the area to be altered. These bands do potentially have an adverse effect in disrupting the contour caused by the die and thus their thickness is to be minimized or provision made to receive the band in the die. When economically warranted, the carrier sheet might be made out of one material with varying thickness, or the less deformable material might be incorporated in a constant thickness carrier sheet, or other such techniques used, with the object of locally altering the deformability of the sheet by changing its elastic modulus or strength. We also envision instances wherein the lower carrier sheet might be comprised of a different material from the upper sheet, to better carry out the objects of the invention.

In the parts we have been concerned with there are quite a number of plies. Therefore, we have found it convenient to fasten the plies together before placing them between the carrier sheets. Tack welding at a peripheral location which can later be discarded in trimming is preferred. This eliminates the possibility that there will be inadvertent misalignment by the operator during assembly in the die.

Final Consolidation of the Part

Figure 8:
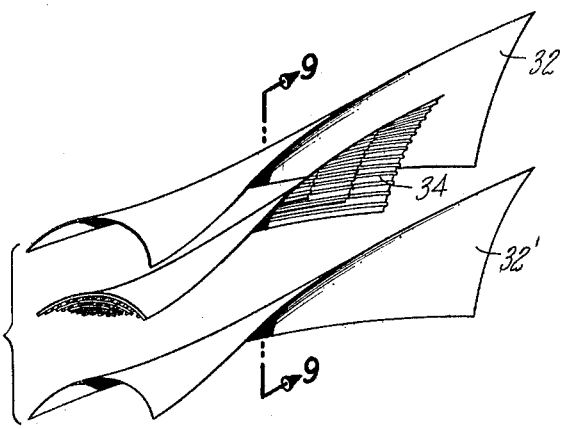
FIG. 8 shows how the composite core and metal skin parts are assembled.
Figure 9:
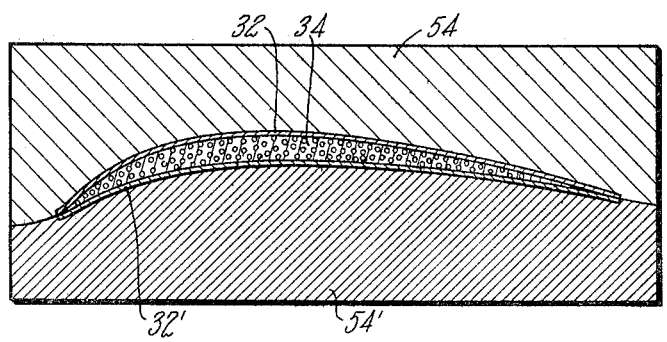
FIG. 9 shows the cross section of the core and skins in the final hard pressing die.

The contours of the dies which formed the skin parts and the composite sheet core part are chosen so that the parts will mate when they are assembled as shown in FIG. 8. The assembly in FIG. 8 will have generally the contour desired in the final part, except understandably attributable to the composite plies which are not consolidated and except as there will have been approximations and deviations in the formulation of the various dies. But on the whole, the elements 32, 32' and 34 will have an approximation of the final shape such that they may readily be interposed into the finishing dies for hot pressing, compared to flat sheets. The hot pressing operation is graphically illustrated in cross section of FIG. 9. Rigid dies 54 and 54' of metal or ceramic have the contour of the final part. The assembly from FIG. 9 is placed within the dies and which are then closed with the application of temperature, time and force sufficient to fully consolidate and bond the multiple elements. In this final step, additional pieces of metal, such as a portion which will comprise the root of the airfoil, may be placed within the hot pressing die in a manner which will cause them to be incorporated and joined to the metal skin covered composite core.

Optionally, in making the preforms and the final assembly, it should be evident that the core may comprise one or more separate preforms, and the skin as well may be comprised of multiple preformed elements. Further the new means for preforming composite plies may be utilized in preparing elements for other final consolidation processes, such as hot isostatic pressing, explosive compaction, and so forth.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. The method of forming contoured composite sheets containing low ductility fibers comprising,
    a. providing a multiplicity of composite sheets containing low ductility fibers;
    b. placing said multiplicity of composite sheets between a first carrier sheet and a second carrier sheet to form a package, the carrier sheets having greater overall dimensions than the composite sheets;
    c. restraining only the carrier sheets by means which fixedly hold their peripheries;
    d. pressurizing the first carrier sheet side of the package with means sufficient to cause permanent deformation and contouring of the package toward the second carrier sheet side;
    e. separating the carrier sheets from the composite sheets.

2. The method of claim 1 further comprising:
   positioning a contoured die in proximity to the second carrier sheet, to receive the package upon deformation; and
   pressurizing the first carrier sheet side sufficiently to cause the second carrier sheet side to intimately contact the die, to produce composite sheets which have a contour substantially determined by the die.

3. The method of claims 1 or 2 wherein the pressurizing means is a gas.

4. The method of claim 2 wherein the die has rails and restraining is accomplished by means acting in cooperation with die rails.

5. The method of claim 2 wherein the die has a ledge and restraining is accomplished by fluid pressure acting on the carrier sheets.

6. The method of claim 2 wherein the composite sheets are fastened together before being placed between the carrier sheets.

7. The method of claim 2 or 6 wherein the composite sheets consist of boron fibers in a metal matrix, wherein the carrier sheets are metal, and wherein the package is heated to 850°–950° C. during the pressurizing step to form the composite sheets without consolidating them and thereby make composite sheets useful as preplies in a subsequent fabrication step.

8. The method of fabricating a contoured structure having a low ductility fiber containing composite material core with a first skin and a second opposing skin, comprising:
    A. preforming the two skin portions by
       (1) placing together a first sheet and a second sheet of skin material within a first die with cavities, to form a sheet pair disposed laterally between opposing contoured cavities of the die, the opposing cavities having portions with the contour desired in the skin portions;
       (2) sealing the sheet pair around its periphery to form a pressure containing space therebetween and providing a pressurization port to said space;
       (3) pressurizing the space between the sheets with a fluid to permanently deform the sheets apart from each other until they contact and comply with the opposing cavities of the die;
       (4) releasing the sheets from fluid pressure and placement within the die;
       (5) cutting as a portion from the first sheet the first skin part, and as a portion from the second sheet the second skin part; the skin parts having substantially the contours desired in the skins of the structure; and
    B. preforming the composite core part by
       (1) providing a multiplicity of composite sheets containing low ductility fibers;
       (2) placing said multiplicity of composite material sheets between a first carrier sheet and a second carrier sheet to form a package, the carrier sheets having greater overall dimensions than the composite sheets;
       (3) clamping only the carrier sheets around their peripheries by means which fixedly hold the peripheries;
       (4) positioning a second contoured die in proximity to the second carrier sheet to receive the package upon deformation;
       (5) pressurizing the first carrier sheet side of the package sufficiently to cause the second carrier sheet to intimately contact the contoured die and thereby permanently deforming the carrier sheets and the composite sheets contained therebetween;
       (6) removing the package from the second die and separating and discarding the carrier sheets; and
    C. placing the preformed fiber composite core between the preformed skins to form an assembly within a third die having the contours desired in the structure being fabricated; and,
    D. pressing the assembly to form the structure.

* * * * *